United States Patent
Knee et al.

(10) Patent No.: US 6,898,321 B1
(45) Date of Patent: May 24, 2005

(54) METHOD AND APPARATUS FOR BLOCKING EFFECT REDUCTION

(75) Inventors: Michael James Knee, Petersfield (GB); Jonathan Diggins, Petersfield (GB)

(73) Assignee: Snell & Wilcox Limited (GB)

( * ) Notice: Subject to any disclaimer, the term of this patent is extended or adjusted under 35 U.S.C. 154(b) by 0 days.

(21) Appl. No.: 09/806,968

(22) PCT Filed: Oct. 11, 1999

(86) PCT No.: PCT/GB99/03356

§ 371 (c)(1),
(2), (4) Date: Apr. 6, 2001

(87) PCT Pub. No.: WO00/22834

PCT Pub. Date: Apr. 20, 2000

(30) Foreign Application Priority Data

Oct. 9, 1998 (GB) .............................................. 9822094

(51) Int. Cl.$^7$ .............................. G06K 9/36; G06K 9/46; G06K 9/38; H04N 7/12; H04N 11/02
(52) U.S. Cl. .................... 382/235; 382/251; 375/240.26
(58) Field of Search .............................. 348/405, 403.1, 348/408–411, 390; 382/251, 253, 232, 233, 236, 235, 268; 358/463; 375/240.24, 240.25, 240.26

(56) References Cited

U.S. PATENT DOCUMENTS

| | | |
|---|---|---|
| 5,086,488 A | 2/1992 | Kato et al. |
| 5,142,380 A | 8/1992 | Sakagami et al. |
| 5,249,053 A | 9/1993 | Jain |
| 5,422,964 A | 6/1995 | Devimeux et al. |
| 5,438,625 A | 8/1995 | Klippel |
| 5,512,956 A | 4/1996 | Yan |
| 5,610,729 A | 3/1997 | Nakajima |
| 5,629,779 A | 5/1997 | Jeon |
| 5,636,295 A | 6/1997 | Kim |
| 5,642,115 A | 6/1997 | Chen |
| 5,671,298 A | 9/1997 | Markandey et al. |
| 5,675,385 A | 10/1997 | Sugiyama |
| 5,732,159 A | 3/1998 | Jung |
| 5,748,245 A | 5/1998 | Shimizu et al. |
| 5,802,218 A | 9/1998 | Brailean |
| 5,812,197 A | 9/1998 | Chan et al. |
| 5,831,688 A | 11/1998 | Yamada et al. |
| 5,930,398 A | 7/1999 | Watney |
| 5,969,764 A * | 10/1999 | Sun et al. ............... 375/240.06 |
| 5,991,456 A | 11/1999 | Rahman et al. |
| 6,005,952 A | 12/1999 | Klippel |
| 6,023,296 A * | 2/2000 | Lee et al. ............... 375/240.05 |
| 6,151,362 A | 11/2000 | Wang |
| 6,163,573 A | 12/2000 | Mihara |
| 6,243,497 B1 * | 6/2001 | Chiang et al. ............... 382/251 |
| 6,269,120 B1 | 7/2001 | Boice et al. |
| 6,278,735 B1 | 8/2001 | Mohsenian |
| 6,285,716 B1 | 9/2001 | Knee et al. |
| 6,360,020 B1 * | 3/2002 | Panis .......................... 382/253 |
| 6,437,827 B1 | 8/2002 | Baudouin |
| 6,539,120 B1 | 3/2003 | Sita et al. |
| 6,570,922 B1 | 5/2003 | Wang et al. |
| 6,810,083 B2 * | 10/2004 | Chen et al. ............. 375/240.25 |
| 2001/0031009 A1 | 10/2001 | Knee et al. |

FOREIGN PATENT DOCUMENTS

| | | |
|---|---|---|
| EP | 0714210 | 5/1996 |
| EP | 0797349 | 9/1997 |
| WO | WO 97/40627 | 10/1997 |

* cited by examiner

*Primary Examiner*—Jon Chang
*Assistant Examiner*—Wesley Tucker
(74) *Attorney, Agent, or Firm*—Michael Best & Friedrich

(57) ABSTRACT

By utilizing parameters derivable from a compressed bitstream, measures are obtained of the subjective quality of a decoded picture, without the necessity for reference to source material. A blockiness measure is derived both locally and globally and used to control a de-blocking filter. An estimate of signal-to-noise ratio is derived from quantization values.

16 Claims, 3 Drawing Sheets

METHOD AND APPARATUS FOR BLOCKING EFFECT REDUCTION

SUMMARY OF THE INVENTION

This invention relates to the estimation of the subjective quality of a picture that has been decoded from a compressed bit-stream and in certain aspects to techniques for improving that subjective quality.

Generally, both the bitstream itself and the decoded picture will be accessible but the original source will not; hence the term 'single-ended' will be applied. Such a single-ended estimate will clearly not be as reliable as one in which the source picture can be compared to the decoded output, but it can serve as a useful indicator of potential problems in a broadcast chain involving compression when the bitstream is being monitored.

The invention relates in the most important example to the MPEG-2 video compression standard, but applies more broadly to transform based compression systems.

A problem to be solved is that of estimating the subjective picture quality of a picture or sequence decoded from an MPEG-2 bitstream. The usual method of performing such an estimate is referred to in this proposal as the "double-ended" method.

The decoded picture is compared with a necessarily delayed version of the source picture. The most common quality measure based on this comparison is the peak signal-to-noise ratio (PSNR) which is based on the ratio of the maximum possible signal power to the power of the difference between source and decoded signals. Other measures are available; some of which attempt to take into account human perception factors.

The disadvantage of all the double-ended methods is that they require access to the picture source. While this is appropriate for testing systems in a laboratory, it cannot normally be used for monitoring the quality of compression in the field.

The object of the present invention is to overcome that disadvantage by providing a series of quality estimation methods based on a "single-ended" approach.

Accordingly, the present invention consists in one aspect in a method of estimating the severity of a picture artefact arising from block based processing, comprising the steps of deriving a pixel difference signal and filtering the signal horizontally and vertically to derive a local measure of artefact severity.

Advantageously, the measure is employed to control the operation of a filter adapted to conceal the visibility of said artefact.

Suitably, the measure is employed to control a fade between the picture signal and the output of said filter.

The present invention consists in another aspect in a method for estimating the signal to noise ratio of a picture signal decoded from a compressed bit-stream, comprising the steps of determining the quantization values employed in said compression and deriving said estimate by processing said values.

Preferably, a measure taken at an upstream location is passed forward for comparison with a measure taken at the device under test.

Embodiments of this invention make use of the "Information Bus" which is the subject of an earlier patent applications (see EP 0 765 576 and EP 0 913 058). The Information Bus is a signal containing all the compression coding decisions and parameters extracted from the compressed bitstream, in an easily accessible form. More sophisticated versions of the quality estimation techniques presented here may also make use of the information signal which is also the subject of EP 0 807 356. This is similar to the Information Bus but carries information about other processes that may have taken place upstream of the compression codec under consideration.

This invention will now be described by way of example with reference to the accompanying drawings, in which:

DETAILED DESCRIPTION OF THE INVENTION

Figure 1:
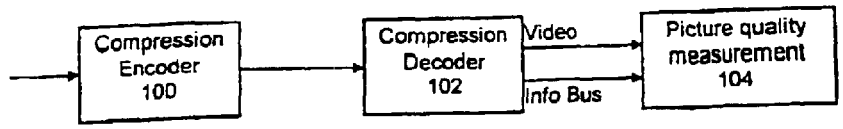
FIG. 1 is a block diagram of a first embodiment of the present invention.

The basic architecture of single-ended quality measurement is shown in FIG. 1.

The MPEG signal from a remote, upstream encoder 100 is received by a decoder 102 which is adapted as described in the previously mentioned references to provide an Information Bus output, in addition to the decoded video. The picture quality measurement unit 104 therefore has access not only to the decoded video but also to coding decisions which were taken by the encoder 100 and which are of course implicit in the MPEG bit-stream.

The picture quality measurement process in one embodiment operates only from information available at the decoder side of the compression codec; the decoded video signal and the Information Bus containing the coding decisions and parameters. It has no access to the picture source. Because of this, the quality measurement can never be completely reliable because there is no way of telling which degradations in the picture are due to the current coding process and which were on the source. So it is not intended as a full replacement for laboratory measurements based on the double-ended approach. But it is useful for many applications and it is certainly sufficient for those monitoring applications in the field where a simple automatic indication of the "red-amber-green" variety is required. However, there will be described later a further embodiment of the invention which involves a modification by which some account can be taken of the source material.

One of the most frequent complaints about MPEG-2 coded pictures is that they appear "blocky", meaning that the block and macroblock structure of the picture is visible. These blocking artefacts can occur for several reasons:

Variation in quantizer scale between macroblocks

Coarse quantization of DC coefficients in non-intra macroblocks

Residual visibility of a prediction error resulting from a non-uniform motion vector field Instead of attempting to analyse each of those possible causes, the "blockiness" measure provided in this embodiment is based simply on the end result, i.e. the decoded picture. There are various possible measures of blockiness, but the principle behind all of them is to compare pixel differences across block boundaries with pixel differences not across block boundaries. In the discussion that follows, care should be taken to recognise the distinction between macroblock (16×16 block) boundaries and DCT block (8×8 block) boundaries.

The following is an example of a measure of blockiness that works on macroblock boundaries:

Horizontal macroblockiness=the picture-by-picture mean absolute horizontal adjacent luminance pixel difference across macroblock boundaries, expressed as a fractional increase over the mean absolute horizontal adjacent pixel difference not across DCT block boundaries.

Figure 2:
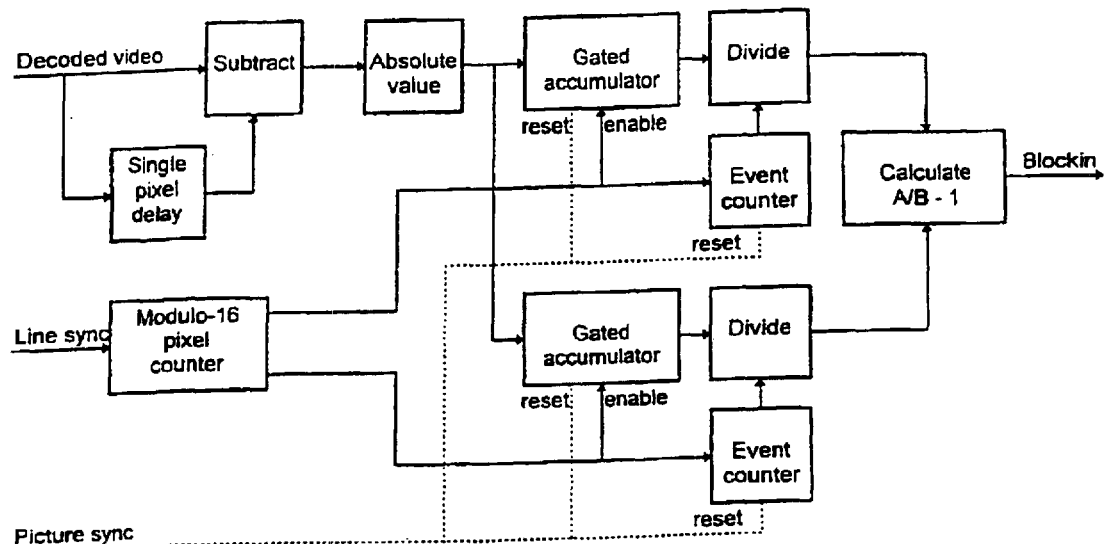
FIGS. 2 and 3 are block diagrams of picture quality measures for use in the arrangement of FIG. 1.

An example showing how this measure could be implemented in hardware is given in FIG. 2.

Pixel differences are taken across a pixel delay and the absolute value calculated. The result is fed to two gated accumulators controlled by a modulo-16 pixel counter which is reset by a line synchronization pulse. The upper accumulator sums the pixel differences across macroblock boundaries (when the modulo-16 pixel count=0) and the lower accumulator sums the pixel differences not across DCT block boundaries (when the modulo-16 pixel count≠0 or 8). Event counters count the occurrences of each of these two cases so that the dividers can calculate mean values of the two quantities. Finally, the fractional increase is calculated, giving the blockiness measure. The accumulators and event counters are reset once per picture.

This particular measure has the interesting property that, when applied to frames that were I-frames in the MPEG-2 bitstream, the result is almost exactly proportional to the average quantizer scale value. When applied to P and B-frames, the result is smaller but reflects quite clearly differences in perceived blockiness arising from differences in motion estimation systems.

The following variations in the definition of the blockiness measure are possible and are considered to be part of the invention:

The DCT block boundary can be used instead of the macroblock boundary. This would require a change the logical outputs of the pixel counter. Note that in both this and the original case the denominator of the fraction is the pixel difference not across DCT block boundaries.

The difference could be taken vertically rather than horizontally (requiring a line delay instead of a pixel delay), or a combination of the two could be used. We have chosen the horizontal difference because this is much easier to calculate in hardware and because the boundaries are the same whether field or frame picture coding was used. However, they may be circumstances in which the vertical differences are easier to calculate.

Mean square values, or the mean of some other function of pixel differences, could be used instead of mean absolute differences.

Some statistical function other than the mean could be used. For example, because it might be considered that very poor blockiness in a small region of the picture might be more disturbing to the eye than an evenly distributed blockiness resulting in the same average value, it might be better to use, for example, the 90th centile of the macroblock boundary pixel difference.

The blockiness could be expressed as a logarithmic ratio (like a dB measure) rather than a fractional increase. This would affect the final block in FIG. 2. It is noted however that a straight difference has been shown experimentally to give good results.

It may be possible to use a reduced number of pixel differences in the measure.

The measurement period could be greater or less than one picture period. This would affect the resetting of the accumulators and event counters in FIG. 2.

It is desirable to record the blockiness separately for I-frames, P-frames and B-frames. The figures are much lower in P and B-frames because the denominator of the expression contains prediction residues that may have come from macroblock or block boundaries in reference frames. To detect the picture type (I, P or B), the Information Bus could be used. Alternatively, in the absence of the Information Bus, a method of picture type detection such as that described in the contemporaneously filed patent application (claiming priority from GB 9822092.4) could be used. A further possibility is that the variations in the blockiness measure itself could be used as the basis of a method of picture type detection.

The above description assumes that the positions of the macroblock boundaries are known. In some cases, this information may not be available. However, it is possible to obtain this information by calculating the blockiness assuming each of the 16 possible positions in turn (either in full or using a reduced number of pixels) and choosing the position that yields the maximum value.

It will be useful in certain applications to have a measure of blockiness, not just for a picture, but also for regions of the picture.

Figure 3:
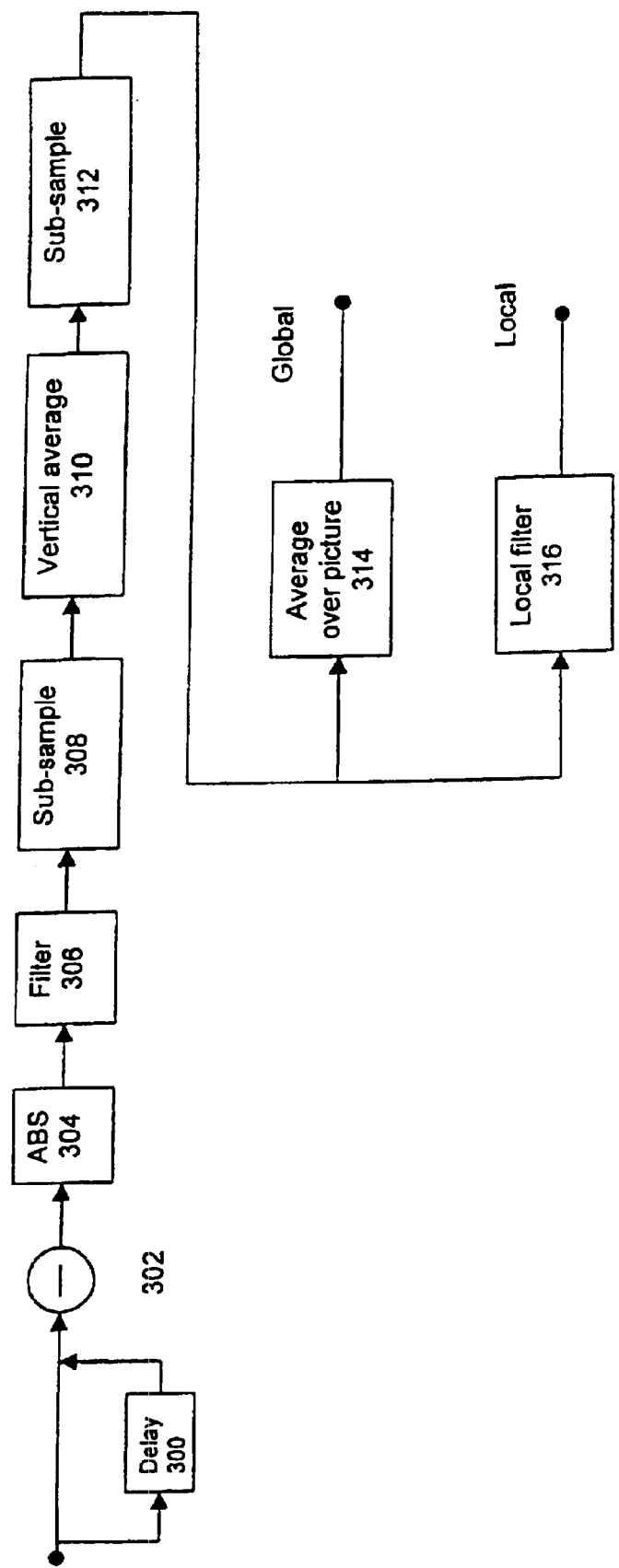

An alternative embodiment for deriving a measure of blockiness will now be described, with reference to FIG. 3.

Delay 300 and subtractor 302 serve to generate the pixel difference signal. The absolute value is taken at 304 and the result is filtered at 306. In the case of 8×8 blocks, the aperture for this filter might be:

−1 . . . −1 −1 14 −1 −1 . . . −1 so as to produce directly the mean absolute difference across macroblock boundaries relative to the mean not across macroblock boundaries. The result is then sub-sampled by 8 in block 308, to remove the meaningless values where the filter is not centred on a macroblock boundary.

The functions of blocks 310 and 312 are, similarly, to construct a vertical average over the 8 lines of a macroblock and then to discard the values which are not required. The resulting measure can be averaged over an entire picture as at 314 or filtered in local filter 316 (with typically an 8×8 moving average) to provide a local measure of blockiness.

It is possible to use the local and global measures in an ingenious fashion to provide for a filter to remove blockiness, which varies in effect in accordance with the local blockiness.

Figure 4:
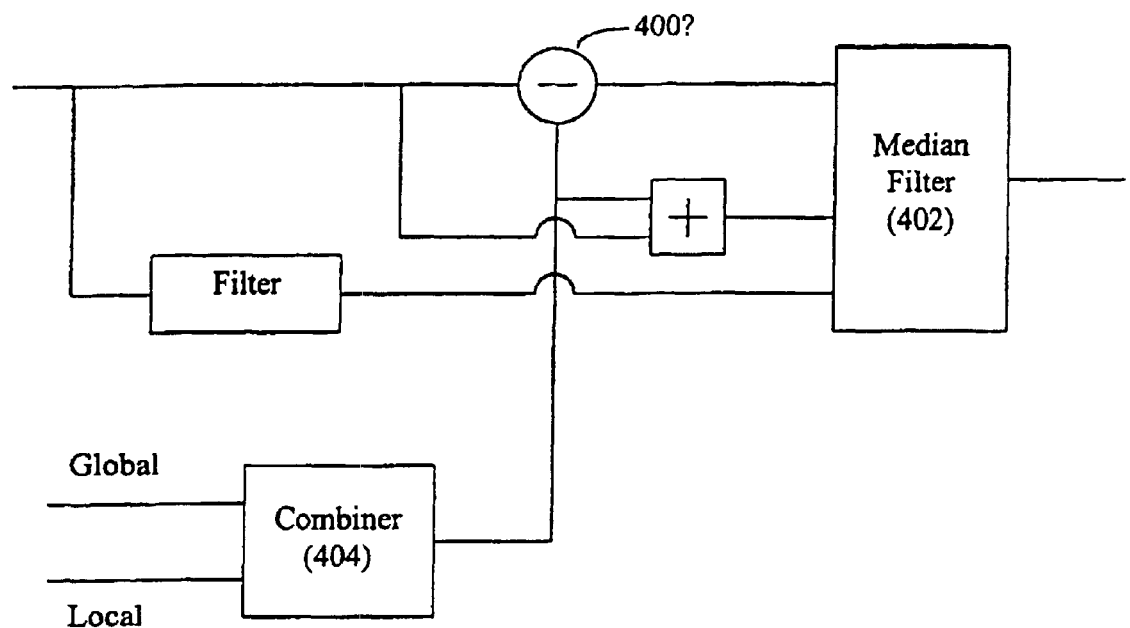
FIG. 4 is a block diagram of a further embodiment of the present invention.
Figure 5:
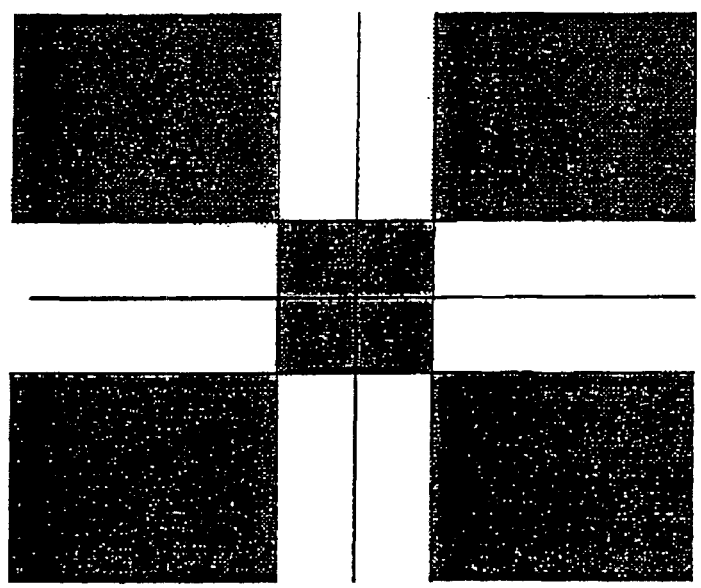
FIG. 5 is a diagram of a filter for use in the arrangement of FIG. 4.

Reference is directed to FIG. 4 which shows a median filter 402, selecting the middle-ranking of three inputs. One input is the uncorrected video input from which has been subtracted at 402 a combined blockiness measure from combiner 404. This receives both the global and local blockiness measures and produces a combined measure. The second median filter input is the sum of the combined blockiness measure and the uncorrected signal whilst the third input is the output of a filter constructed to remove those horizontal and vertical spatial frequencies associated with blockiness. This filter might have pass bands as shown in FIG. 5.

The operation of the described arrangement is to provide an arithmetic fade between the uncorrected video and the filter output, in dependence on the combined blockiness measure. The blockiness measure is effectively compared with the absolute difference between the uncorrected video and the filter output. If the blockiness measure exceeds this difference, the full filtered output is employed. Where the blockiness measure lies between zero and this difference, an arithmetic fade is provided.

A further single-ended quality measure provides an estimate of the peak-signal-to-noise-ratio (PSNR) of the decoded picture. It has been found surprisingly that by using essentially only the quantizer scale values present in the bit-stream an estimate of PSNR can be produced which corresponds well with actual experimental values.

The approach taken is as follows:

$$PSNR_{estimate} = PSNR_0 - \frac{\sum_{allmacroblocks} \log q}{N_{macroblocks}}(A + BH)$$

where q is the the quantizer level spacing q, which is known from the quantizer scale code and q_scale_type parameters received in the Information Bus and A and B are experimentally derived parameters. The base ratio $PSNR_0$ is taken as an experimental value of signal to noise ratio employing the finest allowable quantisation and a pre-determined quantisation weighting matrix.

The sum provides an average quantiser scale value for the picture, the average being taken in the logarithmic domain over all the macroblocks in the picture.

H is an estimate of the entropy of the most recent I-picture which is defined here as the number of DCT coefficient bits that would be generated with a quantiser_scale value of 1, the finest possible. The estimate of H is based on the actual number of coefficient bits generated for each macroblock and the quantiser_scale value used for the macroblock, using a quadratic formula based on a model.

Thus $$H = \sum_{all\,macroblocks} cf(Mq)$$

where c is the number of coefficient bits in the macroblock. The function of Mq is preferably quadratic.

M is a correction factor which corrects for the use of different weighting matrices in the bitstream. It is defined such that it has the value 1 when the matrices used are the MPEG default intra matrix and the MPFG default (i.e. flat) non-intra matrix.

Finally, a correction involving the number of displayed and encoded samples may be added in the form.

$$+10 \log \frac{N_{coded}}{N_{displayed}}$$

This is designed to correct for the subjective effects of working with subsampled pictures and also with letterbox pictures. For example, if a 720×576 picture containing a 720×332 letterbox is sub-sampled to 480×288 for encoding (so that only 166 of the coded lines contain active picture data), the value of $N_{coded}$ is 480×166 and the value of $N_{displayed}$ is 720×576. Note that this correction is for subjective effects and should not be applied if a correlation with PSNR calculated over the whole of the coded picture is being sought.

The approaches described thus far are based on the "single-ended" architecture and as such suffer from the limitation that there is no knowledge of how much of the impairment being measured has come from the coding process and how much has come from the source. A modification will now be described in which that limitation can be partially overcome.

The technique is to apply some or all of the measures to the source and/or to intermediate points in the signal chain and to transmit the results to the decoder under consideration, using a combination of ancillary data in MPEG bitstreams and the Information Bus, according to the principles of the EP 0 807 356. At intermediate points in the chain, where the picture has been decoded from an MPEG bitstream and there is access to the Information Bus resulting from that decoding process, all the measures described above can be used. At the source, or at places where a full Information Bus is not available, the choice of measures may be more limited. In either case, the results can be compared with the current results and the difference will give an indication of how much of the finally measured degradation was due to the intervening compression process or processes.

It should be understood that this invention has been described by way of example only and that a wide variety of modifications are possible without departing from the scope of the invention.

What is claimed is:

1. A method for estimating the signal to noise ratio of a picture signal decoded from a compressed bit-stream, comprising the steps of determining the quantization values employed in said compression, generating a measure of the bit rate of the compressed bit-stream and deriving said estimate by processing said quantization values and said measure of the bit rate.

2. A method according to claim 1, wherein the step of determining the quantization values comprises the step of deriving an average quantizer value for a picture.

3. A method according to claim 2, wherein said average is taken in a logarithmic domain.

4. A method according to claim 1, further comprising the step of using said measure of the bit rate to form a measure of picture activity.

5. A method according to claim 4, in which the compressed bit-stream includes predicted and non-predicted pictures, and wherein said measure of picture activity is formed of the most recent non-predicted picture.

6. A method according to claim 4, wherein the measure of picture activity comprises a product of a number of compression bits and a further function of quantization.

7. A method according to claim 6, wherein said further function of quantization is a quadratic function.

8. A method according to claim 6, wherein said further function of quantization is modified to take into account deviations from a pre-defined quantization weighting matrix.

9. A method according to claim 1, wherein a base signal to noise ratio is taken as an experimental value of signal to noise ratio employing the finest allowable quantization and a pre-determined quantization weighting matrix.

10. A method according to claim 1, wherein the quantization values are quantizer level spacings.

11. A method according to claim 1, wherein a noise measure taken at an upstream location is passed forward for comparison with a noise measure taken at the device under test.

12. A method for estimating the signal to noise ratio $PSNR_{estimate}$ of a picture signal decoded from a compressed bit-stream, comprising the steps of determining quantization values q employed in said compression; generating a measure c of the bit rate of the compressed bitstream and processing said values and said measure to derive:

$$PSNR_{estimate} = PSNR_0 - \frac{\sum \log q}{N}(A + B \sum c \cdot f(Mq))$$

where A is a parameter that can be zero and B is a parameter that can be 1.

13. A method according to claim 12, wherein a base ratio $PSNR_0$ is taken as an experimental value of signal to noise ratio employing the finest allowable quantization and a pre-determined quantization weighting matrix.

14. A method according to claim 12, wherein the function f(q) is a quadratic function of q.

15. A method according to claim 12, wherein the quantization values are quantizer level spacing.

16. A new method according to claim 12, wherein a noise measure taken at an upstream location is passed forward for comparison with a noise measure taken at the device under test.

* * * * *